(12) United States Patent
Yard et al.

(10) Patent No.: US 11,752,820 B1
(45) Date of Patent: Sep. 12, 2023

(54) ALIGNMENT CLIP FOR LEAF SPRING SUSPENSION

(71) Applicant: Nissan North America, Inc., Franklin, TN (US)

(72) Inventors: Allison Yard, Beverly Hills, MI (US); Matthew Gapinski, Franklin, TN (US); Yu Zhang, Mission Viejo, CA (US); Jeff Mazur, New Baltimore, MI (US); Mike Bristol, Royal Oak, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/900,186

(22) Filed: Aug. 31, 2022

(51) Int. Cl.
  *B60G 11/04* (2006.01)
  *B60G 11/10* (2006.01)

(52) U.S. Cl.
  CPC .............. *B60G 11/04* (2013.01); *B60G 11/10* (2013.01); *B60G 2202/112* (2013.01); *B60G 2204/121* (2013.01); *B60G 2206/428* (2013.01); *B60G 2800/162* (2013.01)

(58) Field of Classification Search
  CPC ....... B60G 11/04; B60G 11/107; B60G 11/10; B60G 2202/112; B60G 2206/428; B60G 2800/162; B60G 3/12; B60G 11/02; F16F 1/3683; F16F 1/26
  See application file for complete search history.

(56) References Cited

U.S. PATENT DOCUMENTS

| 6,425,595 B1 * | 7/2002 | Soles | B60G 11/10 280/124.17 |
| 2016/0159182 A1 * | 6/2016 | Cerri, III | B60G 11/02 403/380 |
| 2020/0376910 A1 * | 12/2020 | Peck | B60G 11/113 |
| 2023/0083976 A1 * | 3/2023 | Collyer | B60G 11/113 267/52 |

FOREIGN PATENT DOCUMENTS

| CN | 204226523 U | * | 3/2015 | |
| CN | 204437147 U | * | 7/2015 | |
| CN | 205173324 U | * | 4/2016 | |
| CN | 205651919 U | * | 10/2016 | |
| CN | 106515335 A | * | 3/2017 | ............. B60G 11/02 |
| CN | 206067409 U | * | 4/2017 | |
| CN | 209370336 U | * | 9/2019 | ............. B60G 11/02 |
| CN | 215805919 U | * | 2/2022 | |
| CN | 217463007 U | * | 9/2022 | |

* cited by examiner

*Primary Examiner* — Paul N Dickson
*Assistant Examiner* — Matthew D Lee
(74) *Attorney, Agent, or Firm* — Young Basile Hanlon & MacFarlane, P.C.

(57) ABSTRACT

A releasable alignment clip secures a primary leaf spring to one or more secondary leaf springs of a suspension of a vehicle. The releasable alignment clip prevents separation of the primary leaf spring from the secondary leaf spring during normal operation while permitting relative sliding. The releasable alignment clip has a minimum separation force such that in response to a collision forcing a wheel forwardly, the releasable alignment clip deforms and permits (Continued)

separation of the primary leaf spring from the secondary leaf spring to avoid the primary leaf spring from breaking between the alignment clip and a point of attachment to the vehicle. The releasable alignment clip may have a reduced thickness, notches, or one or more perforations to achieve the minimum separation force.

15 Claims, 4 Drawing Sheets

ALIGNMENT CLIP FOR LEAF SPRING SUSPENSION

TECHNICAL FIELD

This disclosure relates to vehicle suspensions and, more particularly, to leaf spring suspensions.

BACKGROUND

The leaf spring suspension has been used in vehicles for many years. For many passenger vehicles, the leaf spring has been replaced with coil spring suspensions. However, the leaf spring suspension is still well suited for applications such as rear suspensions in light trucks.

A leaf spring suspension includes a primary leaf spring implemented as a curved strip of steel secured at either end to the frame of a vehicle with an axle secured to the middle of the primary leaf spring. In most applications, one or more secondary leaf spring are secured to the primary leaf spring by fasteners securing the axle to the leaf spring suspension. Alignment clips on either side of the axle also secure the secondary leaf springs to the primary leaf spring while still permitting the leaf springs to slide relative to one another.

It would be an advancement in the art to improve the safety and functionality of the leaf spring suspension.

SUMMARY

A releasable alignment clip secures a primary leaf spring to one or more secondary leaf springs of a suspension of a vehicle. The releasable alignment clip prevents separation of the primary leaf spring from the secondary leaf spring during normal operation while permitting relative sliding. The releasable alignment clip has a minimum separation force such that in response to a collision forcing a wheel forwardly, the releasable alignment clip deforms and permits separation of the primary leaf spring from the secondary leaf spring to avoid the primary leaf spring from breaking between the alignment clip and a point of attachment to the vehicle. The releasable alignment clip may have a reduced thickness, notches, or one or more perforations to achieve the minimum separation force.

Disclosed herein are implementations of a vehicle including a vehicle frame member, an axle, and a leaf spring suspension. The leaf spring suspension may include a primary leaf spring having a first end and a second end, the first end and the second end being fastened to the vehicle frame member. The leaf spring suspension may include one or more secondary leaf springs stacked against the primary leaf spring. An axle attachment structure secures the axle to the primary leaf spring and one or more secondary leaf springs. A releasable alignment clip secures the primary leaf spring to the one or more secondary leaf springs, the releasable alignment clip being positioned between the first end and the axle attachment structure. The releasable alignment clip is configured to release the primary leaf spring from the one or more secondary leaf springs responsive to movement of the axle toward the first end in excess of a threshold amount.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
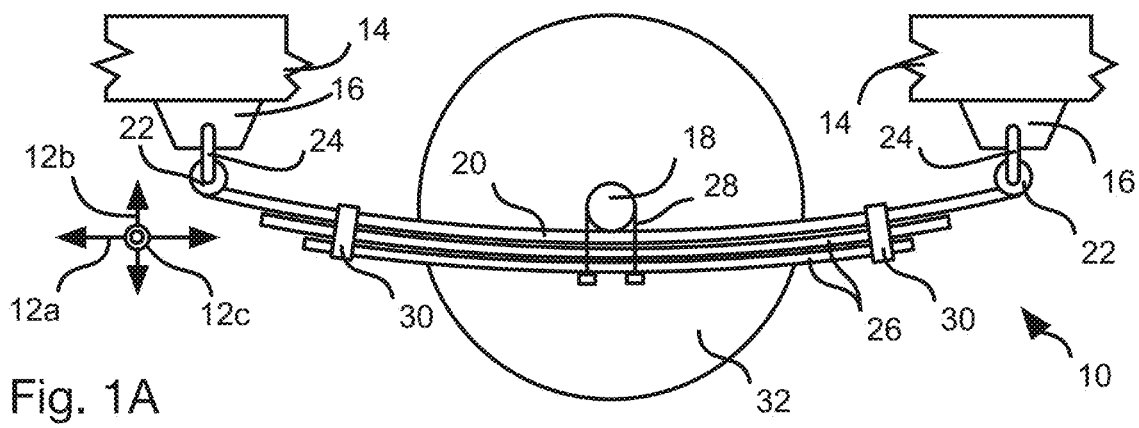
FIG. 1A is a schematic representation of a leaf spring suspension.

Referring to FIG. 1A, a leaf spring suspension 10 may be understood with respect to a longitudinal direction 12a, a vertical direction 12b, and a transverse direction 12c that are mutually perpendicular to one another. In operation the longitudinal direction 12a is substantially parallel to the direction of travel of a vehicle incorporating the leaf spring suspension 10, and the vertical direction 12b is substantially perpendicular to a surface on which the vehicle travels. The transverse direction 12c runs along a width of the vehicle. As used herein, the term "substantially" when used with respect to an angle shall be understood to be within 5 degrees of the angle, e.g., within 5 degrees of parallel or perpendicular.

The leaf spring suspension 10 may be mounted to a frame member 14 of the vehicle either directly or by means of brackets 16 secured to the frame member 14 by welds, bolts, or other fastening means. The leaf spring suspension 10 may provide a compliant connection between an axle 18 and the frame member 14.

The leaf spring suspension 10 may include a primary leaf spring 20 embodied as a strip of steel having eyes 22 formed at the ends thereof. The eyes 22 may be formed by rolling end portions of the strip of steel to form an opening. Each eye 22 may provide an attachment point for a shackle 24 that is also mounted to one of the brackets 16. Each shackle 24 may be pivotably mounted to one of the eyes 22 and to one of the brackets 16 to accommodate both movement of the primary leaf spring 20 when compressed and longitudinal movement induced by road irregularities.

The leaf spring suspension 10 may include one or more secondary leaf springs 26, that may each be embodied as strips of steel similar to the primary leaf spring 20 but lacking the eyes 22. The secondary leaf springs 26 may have widths in the transverse direction 12c substantially identical to that of the primary leaf spring 20. As used herein, the term "substantially" when used with respect to a distance shall be understood to be within 5 percent of the distance. The secondary leaf springs 26 may each have a thickness (e.g., measured in the vertical direction 12b at a midpoint along the longitudinal direction 12a) that is substantially identical to or different from that of the primary leaf spring 20. As is apparent in FIG. 1A, the extent of each secondary leaf spring 26 along the longitudinal direction 12a may be less than that of the primary leaf spring 20. Likewise, the extent of a first secondary leaf spring 26 along the longitudinal direction 12a may be less than that of any second secondary leaf spring 26 positioned between the first secondary leaf spring 26 and the primary leaf spring 20.

The primary leaf spring 20 may be secured to the axle 18 by one or more fasteners 28, such as one or more U-bolts. A wheel 32 is also secured to the axle 18 by means of a hub using any approach known in the art. The one or more fasteners 28 may also secure the one or more secondary leaf springs 26 to the primary leaf spring 20 and to the axle 18. Alternatively, one or more fasteners may secure the primary leaf spring 20 to the one or more secondary leaf springs 26 in the region (e.g., within 10 cm) of the axle 18 along the longitudinal direction 12*a*.

Between each eye 22 and the fasteners 28, alignment clips 30 may completely or partially encircle or surround the primary leaf spring 20 and secondary leaf springs 26. The alignment clips 30 may permit sliding of the primary leaf springs 20 and secondary leaf springs 26 relative to one another during compression and rebounding. However, the alignment clips 30 reduce or prevent misalignment of the primary and secondary leaf springs 20, 26 relative to one another along the transverse direction 12*c*. For example, the alignment clips 30 may limit relative movement between the primary and secondary leaf springs 20, 26 in the transverse direction 12*c* to less than 3 mm absent deformation of the alignment clips 30.

In addition, the alignment clips 30 reduce or prevent separation of the primary and secondary leaf springs 20, 26 relative to one another during rebounding of the leaf spring suspension 10. When the axle 18 is moved upward, each secondary leaf spring 26 is pressed against either the primary leaf spring 20 or a higher-positioned secondary leaf spring 26. However, upon rebounding, the ends of each secondary leaf spring 26 are not supported by another leaf spring and, in the absence of alignment clips 30, would separate from one another. This could cause acceleration sufficiently large to break one or more of the primary and secondary leaf springs 20, 26 and impacts between the primary and secondary leaf springs 20, 26 that could also cause failure. For example, the alignment clips 30 may limit relative movement between the leaf springs 20, 26 in the vertical direction 12*b* to less than 3 mm absent deformation of the alignment clips 30.

Figure 1B:
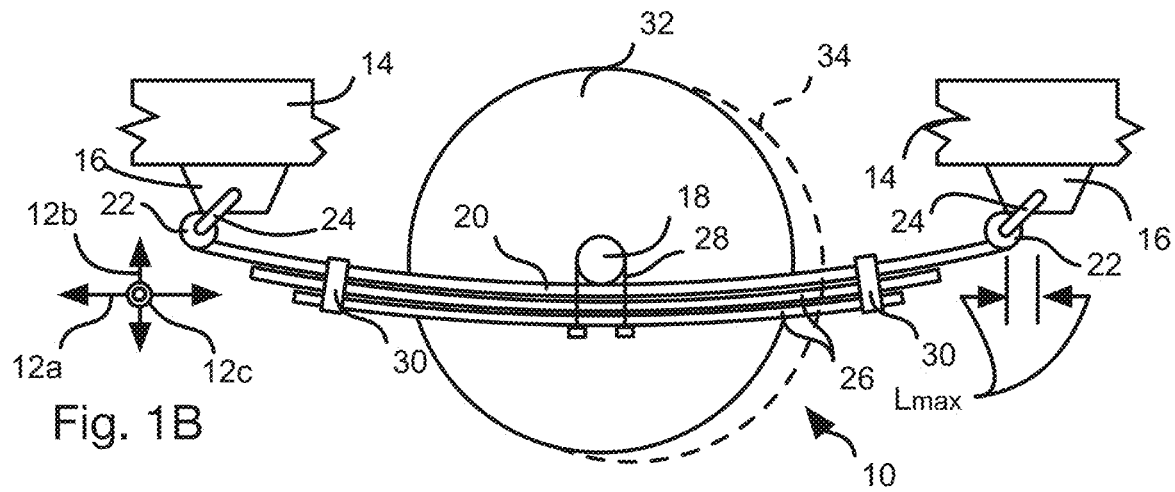
FIG. 1B illustrates longitudinal displacement of the leaf spring suspension in normal operation.

Referring to FIG. 1B, the shackles 24 in engagement with the brackets 16 and eyes 22 permit a non-catastrophic amount of movement $L_{max}$ along the longitudinal direction 12*a* relative to a neutral position 34 of the wheel 32. "Non-catastrophic" may be understood as meaning that permanent (inelastic) deformation or cracking of the brackets 16, shackles 24, eyes 22, primary leaf spring 20 does not occur. The neutral position 34 of the wheel 32 may be understood as the position of the wheel 32 relative to the frame member 14 when the vehicle is parked on a level surface and is unloaded (e.g., a full tank of gas with no passengers or cargo).

Movement $L_{max}$, may result from the wheel 32 hitting a road irregularity or hard braking that tends to push the wheel 32 backward relative to the frame member 14. The value of $L_{max}$, may be determined primarily by the extent of the shackle 24 between axes of rotation defined by the shackle 24 with respect to the bracket 16 and the eye 22 to which it pivotably secures. $L_{max}$, may be a limit imposed due to interference of the shackle 24 and/or primary leaf spring 20 with the bracket 16 or frame member 14. The value of $L_{max}$, may be selected to provide a degree of compliance to reduce stress on components of the leaf spring suspension 10 while still providing predictable handling of the vehicle.

Figure 1C:
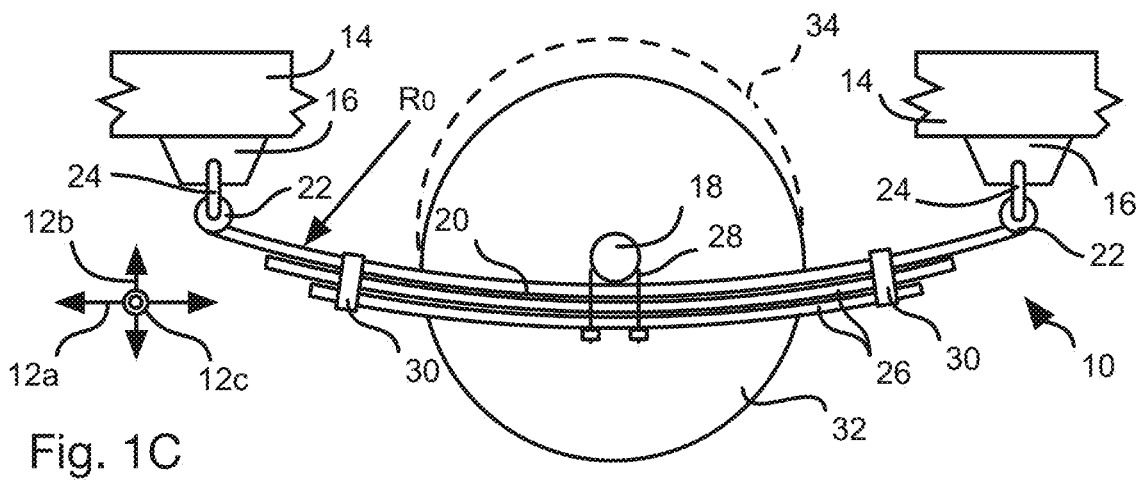
FIG. 1C illustrates vertical deformation of the leaf spring in normal operation.

Referring to FIG. 1C, the vertical range of motion of the wheel 32 relative to the neutral position 34 may be defined by an upper limit at which interference prevents further movement. This interference may be interference between the wheel 32 and the frame member 14, fender, or other member of the vehicle. Interference may also be interference between the axle 18 and the frame member 14 or other member of the vehicle. The lower limit of the vertical range of motion may be defined as the maximum distance reached by the wheel 32 relative to the neutral position 34 when pushed to the upper limit, released, and allowed to rebound due to the restoring force of the leaf spring suspension 10 without interference from a support surface.

When at the lower limit, the primary leaf spring 20 will be at its most curved shape within normal (non-catastrophic) operation. The primary leaf spring 20 when undeformed may have an elliptical or other non-circular curvature. A minimum operational radius of curvature $R_0$ may therefore be defined as the minimum radius of curvature on an upper surface of the primary leaf spring 20 measured in a plane parallel to the longitudinal direction 12*a* and vertical direction 12*b* ("the longitudinal-vertical plane") when the wheel 32 is at the lower limit. This definition excludes curved portions of the primary leaf spring 20 defining the eyes 22 and a transition in the vicinity of the eyes 22 (e.g., within 5 cm of each eye 22). Radius of curvature is the radius of a circle that best fits the portion P.

Figure 2A:
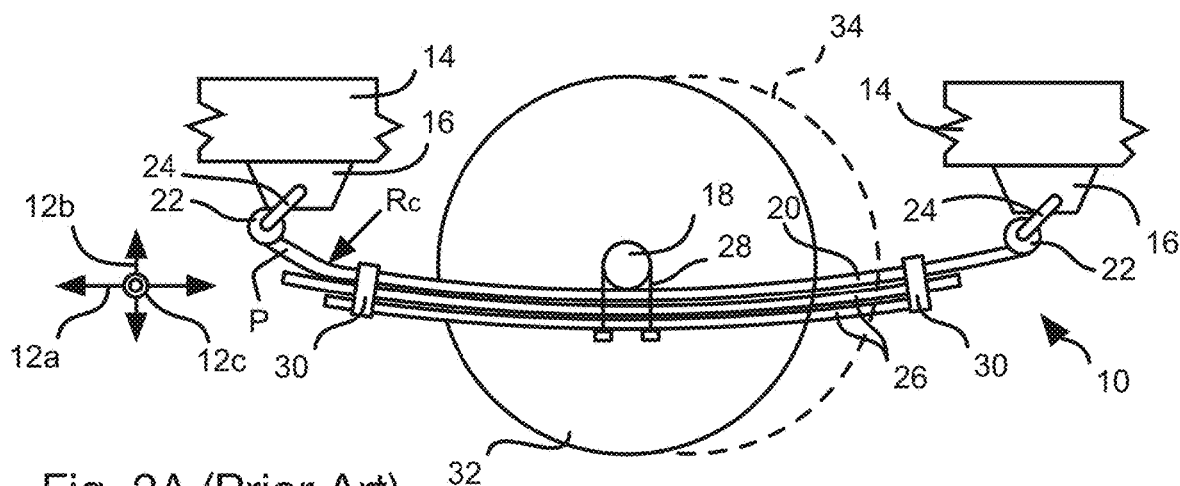
FIG. 2A illustrates deformation of the leaf spring suspension in response to a collision in accordance with the prior art.

Referring to FIG. 2A, in the event of a collision, the wheel 32 may be displaced in the longitudinal direction 12*a* in excess of $L_{max}$. In the configuration of FIG. 2A, the left side corresponds to the front of the vehicle incorporating the leaf spring suspension 10 and the right side corresponds to the rear of the vehicle. The illustrated displacement may therefore correspond to a rear impact or a side impact at an angle such that a component of the impact force is directed forward along the longitudinal direction 12*a*.

The forward (left side) alignment clip 30 binds the primary leaf spring 20 to the secondary leaf springs 26 such that a portion P of the primary leaf spring 20 extends between the alignment clip 30 and the eye 22. This portion P is at least in part unsupported by any secondary leaf spring 26 and the entire force imposed on the leaf spring suspension 10 by an impact is transmitted through this portion P. Because the alignment clip is holding the primary and secondary leaf springs 20, 26 together, the portion P is forced to curve, resulting in a radius of curvature that is smaller than $R_0$. At some imposed force on this portion P, the radius of curvature may decrease to a point $R_c$ that results in breakage of the primary leaf spring 20. This may result in a near instantaneous release of energy stored in the primary leaf spring 20, which may cause additional damage to the vehicle.

Figure 2B:
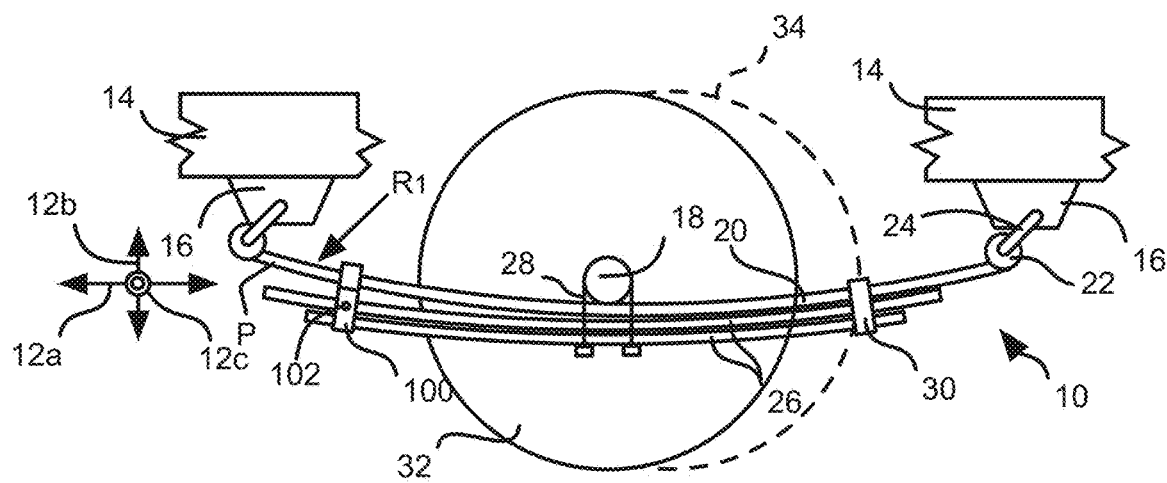
FIG. 2B illustrates deformation of the leaf spring suspension in response to a collision with the use of a releasable alignment clip in accordance with an embodiment.

Referring to FIG. 2B, in some embodiments the leaf spring suspension 10 incorporates a releasable alignment clip 100 according to the embodiments disclosed herein. The releasable alignment clip 100 is used in place of the alignment clip 30 in the forward position. Optionally, a second releasable alignment clip 100 may also be used in place of the alignment clip 30 in the rear position. Responsive to a collision having a component directed forward along the longitudinal direction 12*a*, the primary leaf spring 20 in the portion P is permitted to separate from the secondary leaf springs 26 by deformation or release of the releasable alignment clip 100. The releasable alignment clip 100 may be configured such that the releasable alignment clip 100 begins to deform when the portion P has a radius of curvature of R1, where $R_c < R_1 < R_0$. In this manner, the deformation caused by the force of impact may be spread across a larger portion of the primary leaf spring 20, at least the portion between the eye 22 and one or more fasteners 28.

In some embodiments, a fastener 102 secures the releasable alignment clip 100 to one of the secondary leaf springs 26 such that the releasable alignment clip 100 is not projected outwardly from the vehicle following deformation. The fastener 102 may be a bolt extending into a threaded opening in one of the secondary leaf springs 26. Alternatively, the fastener 102 may be embodied as a weld, clamp, or other fastening means.

The releasable alignment clip 100 is configured to release the primary leaf spring 20 from the one or more secondary leaf springs 26 responsive to movement of the axle 18 or wheel toward the first end of the primary leaf spring in excess of a threshold amount. The threshold amount can be an amount of axle or wheel displacement, such that the releasable alignment clip releases when the axle displacement exceeds the threshold amount. Various other metrics may be used to determine the separation force between the primary leaf spring 20 and the secondary leaf springs 26 at which the releasable alignment clip 100 begins to inelastically deform (hereinafter "the minimum separation force") or the threshold amount of displacement. For example, the minimum separation force may be selected such that no portion of the primary leaf spring 20 has a radius of curvature less than 25 percent of the radius of curvature $R_0$ of the primary leaf spring when unloaded (e.g., when the vehicle is unloaded as defined above).

Figure 3:
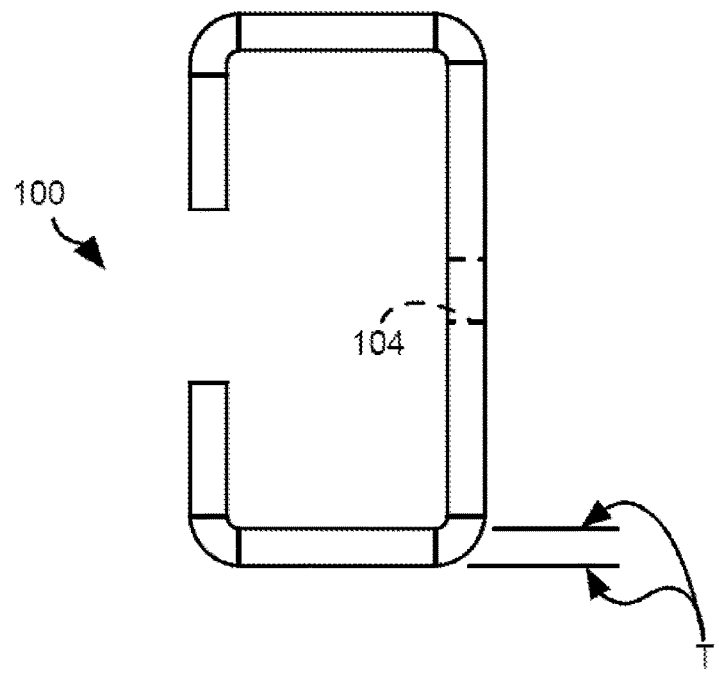
FIG. 3 is a side view of the releasable alignment clip in accordance with an embodiment.

Various parameters of the releasable alignment clip 100 may be selected in order to respond with the desired deformation or release in response to the above-described minimum separation force. In FIG. 3, for example, the releasable alignment clip 100 is embodied as a strip of metal bent into the illustrated "C" shape. Aperture 104 receives the fastener 102. The area defined within the "C" shape may be sized to receive the primary leaf spring 20 and secondary leaf springs 26 in an interference fit or such that the primary and secondary leaf springs 20, 26 may be freely slid into the releasable alignment clip 100. The thickness T of the entire releasable alignment clip 100 may be optimized to provide sufficient elasticity to release under the minimum separation force. For example, a conventional alignment clip 30 has a thickness of 5 mm. At this conventional thickness, the alignment clip 30 does not deform, causing the primary leaf spring 20 to deform instead. In contrast, the thickness T of the releasable alignment clip 100 as disclosed herein may be between 3.5 and 4 mm. It has been found that 3.8 mm retains the primary and secondary leaf springs 20, 26 during normal operation but deforms to release the primary and secondary leaf springs 20, 26 under the minimum separator force. The width of the releasable alignment clip 100 may also be selected to achieve the minimum separation force.

Figure 4:
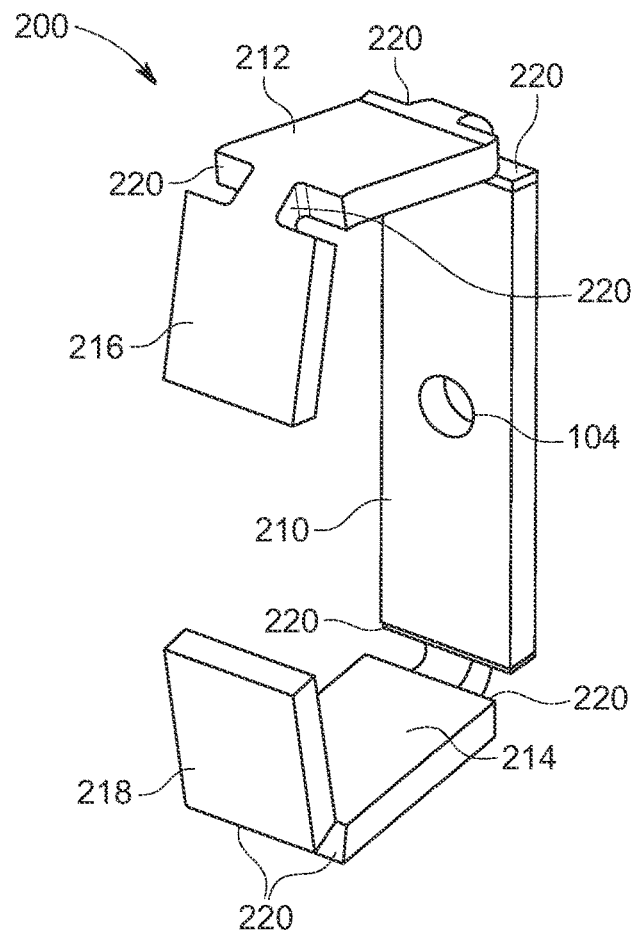
FIG. 4 is an isometric view of the releasable alignment clip in accordance with another embodiment.

Alternatively, other parameters of the releasable alignment clip may be selected in order to respond with the desired deformation or release in response to the above-described minimum separation force. In FIG. 4, for example, releasable alignment clip 200, may be of conventional thickness and formed in the "C" shape as illustrated. However, the releasable alignment clip 200 is weakened in select positions to provide the deformation required under the minimum separation force. For example, the releasable alignment clip 200 has a first lateral side 210, top side 212, bottom side 214, upper second lateral side 216 and lower second lateral side 218. To increase the elasticity of the releasable alignment clip 200, notches 220 are formed in the corners between the first lateral side 210 and the top side 212, the upper second lateral side 216 and the top side 212, the first lateral side 210 and the bottom side 214, and the lower second lateral side 218 and the bottom side 214.

Figure 5:
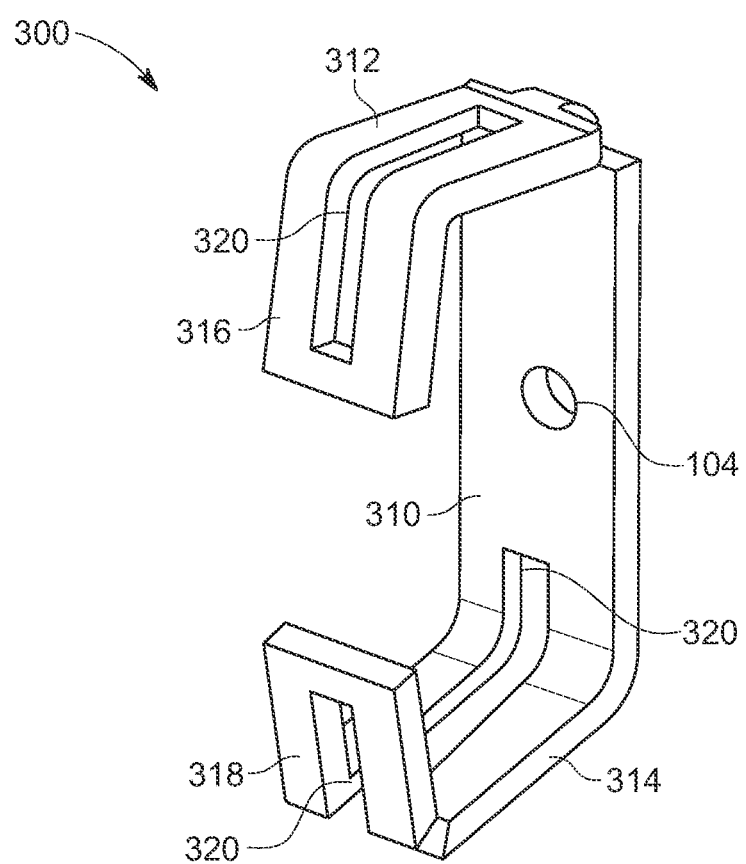
FIG. 5 is an isometric view of the releasable alignment clip in accordance with another embodiment.

In other embodiments, other parameters of the releasable alignment clip may be selected in order to respond with the desired deformation or release in response to the above-described minimum separation force. In FIG. 5, for example, releasable alignment clip 300, may be of conventional thickness and formed in the "C" shape as illustrated. However, the releasable alignment clip 300 is weakened in select positions to provide the deformation required under the minimum separation force. For example, the releasable alignment clip 300 can have a perforations 320 across upper and lower corners defined by an upper second lateral side 316 and a top side 312, the top side 312 and a first lateral side 310, the first lateral side 310 and a bottom side 314, the bottom side 314 and a lower second lateral side 318. The perforations 320 selectively weaken the releasable alignment clip 300 in order to deform or release under the minimum separation force. The perforations 320 can alternative connect along the top side 312 and the bottom side 314 to form a continuous perforation covering the top two corners and a continuous perforation covering the bottom two corners.

The failure of the primary leaf spring 20 that is ameliorated by the releasable alignment clips 100, 200, 300 has been found to occur at the forward end of the primary leaf spring 20 in the portion P. Accordingly, in some embodiments, the releasable alignment clip 100, 200, 300 is implemented as the forward alignment clip whereas the rear alignment clip is a conventional alignment clip 30. However, in order to reduce the number of unique parts required to construct a vehicle or to handle collisions urging an axle 18 rearwardly, both the forward and rearward alignment clips may be implemented as releasable alignment clips 100, 200, 300 having the same or different minimum separation forces. The releasable alignment clip 100, 200, 300 may be used with the leaf spring suspensions 10 on the rear axle, or may be used with the leaf spring suspensions 10 on both of the front and rear axles.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A vehicle comprising:
 a vehicle frame member;
 an axle; and
 a leaf spring suspension comprising:
  a primary leaf spring having a first end and a second end, the first end and the second end being fastened to the vehicle frame member;
  one or more secondary leaf springs stacked against the primary leaf spring;
  an axle attachment structure securing the axle to the primary leaf spring and the one or more secondary leaf springs; and
  a releasable alignment clip securing the primary leaf spring to the one or more secondary leaf springs, the releasable alignment clip being positioned between the first end and the axle attachment structure, the releasable alignment clip configured to release the primary leaf spring from the one or more secondary leaf springs responsive to movement of the axle toward the first end in excess of a threshold amount.

2. The vehicle of claim 1, further comprising:
a first shackle pivotably securing the first end to the vehicle frame member; and
a second shackle pivotably securing the second end to the vehicle frame member;
wherein the threshold amount is greater than a range of movement along a longitudinal direction permitted by the first shackle and the second shackle, the longitudinal direction defined as extending between the first end and the second end.

3. The vehicle of claim 1, further comprising:
a first shackle pivotably secured to the first end and pivotably secured to the vehicle frame member; and
a second shackle pivotably secured to the second end and pivotably secured to the vehicle frame member;
wherein the threshold amount is greater than a range of movement along a longitudinal direction permitted by the first shackle and the second shackle, the longitudinal direction defined as extending between the first end and the second end.

4. The vehicle of claim 1, wherein the releasable alignment clip comprises a C-shaped metal strip at least partially surrounding the primary leaf spring and the one or more secondary leaf springs, the C-shaped metal strip having a thickness of between 3.5 mm and 4 mm.

5. The vehicle of claim 4, wherein the C-shaped metal strip has a thickness equal to 3.8 mm.

6. The vehicle of claim 1, wherein the releasable alignment clip has a top side, a bottom side, a first lateral side, an upper second lateral side and a lower second lateral side and has notches in each corner between the top side and the first lateral side, the top side and the upper second lateral side, the bottom side and the first lateral side, and the bottom side and the lower second lateral side.

7. The vehicle of claim 1, wherein the releasable alignment clip has a top side, a bottom side, a first lateral side, an upper second lateral side and a lower second lateral side and has perforations extending from the top side to the first lateral side, from the top side to the upper second lateral side, from the bottom side to the first lateral side, and from the bottom side to the lower second lateral side.

8. The vehicle of claim 7, wherein the perforations extend along a length of each of the top side and the bottom side.

9. The vehicle of claim 1, wherein the axle is a rear axle, the first end of the primary leaf spring being closer to a front of the vehicle than the second end of the primary leaf spring.

10. A vehicle comprising:
a vehicle frame member;
an axle; and
a leaf spring suspension comprising:
a primary leaf spring having a first end and a second end, the first end and the second end being fastened to the vehicle frame member;
one or more secondary leaf springs stacked against the primary leaf spring;
an axle attachment structure securing the axle to the primary leaf spring and the one or more secondary leaf springs; and
a releasable alignment clip at least partially surrounding the primary leaf spring and the one or more secondary leaf springs, the releasable alignment clip being positioned between the first end of the primary leaf spring and the axle attachment structure;
wherein the primary leaf spring has a first radius of curvature when unloaded; and
wherein the releasable alignment clip is configured to release the primary leaf spring from the one or more secondary leaf springs responsive to bending of the primary leaf spring in response to displacement of the axle.

11. The vehicle of claim 10, wherein the releasable alignment clip comprises a C-shaped metal strip at least partially surrounding the primary leaf spring and the one or more secondary leaf springs, the C-shaped metal strip having a thickness of between 3.5 mm and 4 mm.

12. The vehicle of claim 11, wherein the C-shaped metal strip has a thickness equal to 3.8 mm.

13. The vehicle of claim 10, wherein the releasable alignment clip has a top side, a bottom side, a first lateral side, an upper second lateral side and a lower second lateral side and has notches in each corner between the top side and the first lateral side, the top side and the upper second lateral side, the bottom side and the first lateral side, and the bottom side and the lower second lateral side.

14. The vehicle of claim 10, wherein the releasable alignment clip has a top side, a bottom side, a first lateral side, an upper second lateral side and a lower second lateral side and has perforations extending from the top side to the first lateral side, from the top side to the upper second lateral side, from the bottom side to the first lateral side, and from the bottom side to the lower second lateral side.

15. The vehicle of claim 14, wherein the perforations extend along a length of each of the top side and the bottom side.

\* \* \* \* \*